United States Patent Office 3,539,810
Patented Nov. 10, 1970

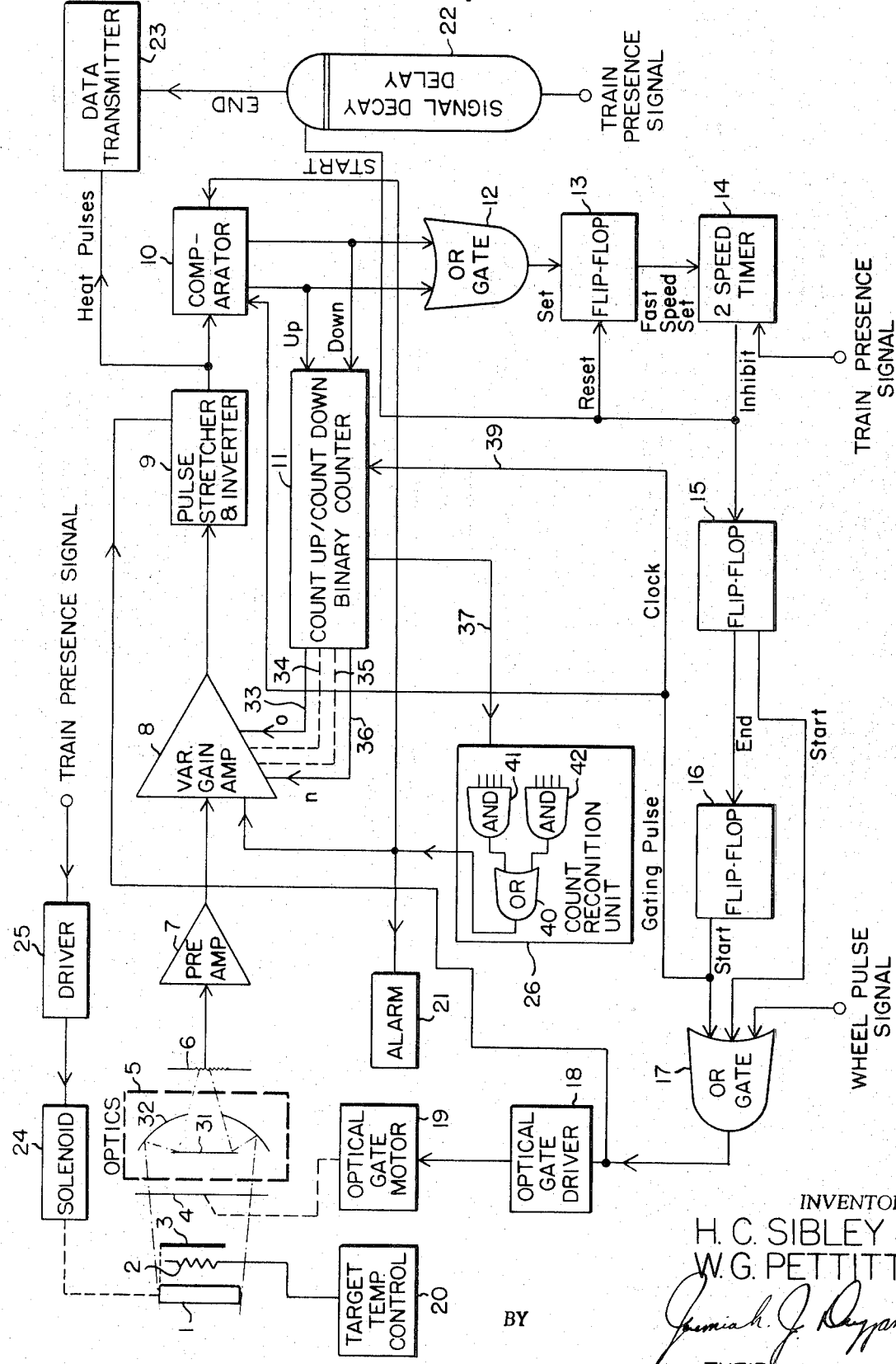

1

3,539,810
CALIBRATED OVERHEATED BEARING INDICATOR
Walter G. Pettitt, Rochester, and Henry C. Sibley, Adams Basin, N.Y., assignors to General Signal Corporation, Rochester, N.Y., a corporation of New York
Filed May 27, 1968, Ser. No. 732,453
Int. Cl. G01j 5/06, 5/16
U.S. Cl. 250—83.3                                13 Claims

ABSTRACT OF THE DISCLOSURE

An improved overheated bearing indicator wherein the output signal of an infrared detector in response to a target of controlled temperature is servoed to a predetermined value.

BACKGROUND OF THE INVENTION

This invention relates to an improved overheated bearing detector system, and more particularly pertains to a system employing automatic calibration of a detector output signal corresponding to wheel bearings of railway cars.

Overheated bearing detectors on railway systems have brought to the attention of railway personnel numerous wheel bearings showing indications of impending failure. The availability of such information has materially decreased the number of accidents and derailments caused by failure of wheel bearings, and an increasing dependence is being placed upon the effectiveness of these detectors to reliably forecast incipient bearing failure.

The overheated bearing detectors currently in use are primarily of the infrared sensing type and have to a large extent provided satisfactory performance. However, with the greater dependence upon these devices it has become necessary that their reliability and sensitivity be appreciably increased. In the majority of detectors the sensing equipment is placed at the wayside and is activated by auxiliary equipment indicating the presence of an approaching vehicle. Upon actual passage of the vehicle, wheel detecting units generate signals for gating the wayside equipment; the wayside equipment upon receipt of the gating signal exposes a series of optics to the thermal energy radiated by that portion of the wheel having a temperature most indicative of actual bearing temperature. The infrared detector upon exposure to this temperature generates a signal providing the basis for a judgment decision concerning the possibility of bearing failure.

Obviously, to increase the reliability of such equipment, prior art systems have been substantially ruggedized, using components and devices less susceptible to shock and vibration and capable of relatively long performance life. In addition to these apparent design objectives, it was also found necessary to provide means for checking the response of the wayside equipment, i.e. the sensor and associated optics and circuitry, to signals simulating those received during actual passage of car wheels.

In a system disclosed in Pat. No. 3,235,723 by Pelino dated February 15, 1966, the response and the electrical qualities of the system during normal operation are monitored so as to provide a check of its condition. This type of check while satisfactorily assuring the proper functioning of associated circuitry, fails to provide any indication regarding the response of the detector to an actual overheated bearing.

Another step in this direction is disclosed in Pat. No. 3,313,933 by Sibley, dated Apr. 11, 1967, wherein a check on system performance of a more complete nature is made. In this patent, prior to the passing of an actual wheel, both the optics and the sensor are subjected to a source of radiant energy sufficiently high so as to produce in the circuitry a signal indicative of an overheated bearing. If in response to this simulated bearing signal a desired indication is not derived an alarm indication is established, giving the central office notice of equipment failure. The operation of such overheated bearing detector, while an improvement over that previously disclosed, still falls short of satisfying the increased needs for reliability and sensitivity of operation. It does not provide for the calibration of the simulated target temperature with respect to variations in ambient and for that reason cannot be considered to have established any directly simulative wheel bearing signal, further, no indication of the quality of this response is given, and thus a system apparently in sound working condition may produce ambiguities of indication around the threshold temperature level. In addition, upon the finding of detector inadequacy no means is provided for its correction or adjustment to provide satisfactory performance.

Relative to the effect of ambient, it has been noted that bearing temperatures indicative of incipient failure vary as a function of ambient temperature. Further, at some ranges of ambient temperature, overlap between normal bearing temperature and an ovedheated condition occurs, thus introducing a possibility of ambiguous indications if tight control of detector response is not exercised. This effect of ambient therefore constitutes another important and critical aspect of defective bearing indicator operation.

An advance in obviating the effects of ambient involves the compensation of the sensor and its associated circuitry to maintain a flat response under a range of ambient temperatures. To accomplish this desired end result, various temperature compensations are employed to control the actual temperature of the detector cell as well as the response of the circuitry; although this approach has proven satisfactory thereby rendering the detector substantially insensitive to variations in ambient temperature, it is economically questionable and fails to provide the preciseness of control required in all applications.

The invention disclosed in this application overcomes the foregoing problems concerning reliability and sesitivity and provides an economical, reliable and self-calibrating overheated wheel bearing detector system.

It is therefore an object of this invention to provide an overheated wheel bearing detector in which the output of a sensor is servoed to produce a predetermined signal level in response to energy radiated from a controlled source.

Another object of this invention is to provide a defective bearing detector in which the output of a sensor is servoed to provide a predetermined signal level in response to energy radiated from a source having a temperature controlled as a function of ambient temperature.

Another object of this invention is to provide an overheated wheel bearing detector wherein the output of a sensor is adjusted by varying the gain of an amplifier.

Another object of this invention is to provide an overheated bearing detector having a gain adjusting servo in which the adjustment is made in discrete steps in response to the count of a reversible binary counter.

Another object of this invention is to provide an overheated wheel bearing detector in which a sensor is periodically exposed to a thermal energy generator by the intermittent energization of an optical shutter.

Another object of this invention is to provide a detector giving indication whenever the gain adjustment counter has reached either its minimum or maximum adjustment count.

Another object of this invention is to provide a detector system in which a calibration check is made and transmitted to the central office after each train passage.

Yet another object of this invention is the providing of a detector system wherein the sensor output in response to the thermal generator is checked at a normal rate and at an increased rate whenever an out-of-calibration condition is indicated.

Still another object of this invention is to provide an overheated wheel bearing detection system having improved optical system.

SUMMARY OF THE INVENTION

In accordance with this invention an improved overheated vehicle wheel bearing detector is provided, in which a sensor means responsive to thermal energy develops a signal correlative to a target temperature and a generator means produces thermal energy. The improvement includes calibration means for exposing the sensor means to the generator energy and servoing the resultant sensor output to a desired value.

In accordance with another improvement of this invention means are provided for indicating when the sensor output signal is beyond a predetermined calibration range and for generating a signal indicative of the sensor output after each vehicle or train passage.

A further improvement of the invention comprises sensor means including a modified Cassagrainian optic system having a parabolic primary mirror and a flat secondary mirror for decreasing the aberrations of field of the sensor optics.

The foregoing summary of the invention, as well as other advantages and objects, will be apparent upon a study of the following drawing and detailed description of a preferred embodiment.

A BRIEF DESCRIPTION OF THE DRAWING

The drawing of this application comprises an exemplary function block diagram of an automatic calibrating overheated wheel bearing detector system.

DESCRIPTION OF THE PREFERRED EMBODIMENT

The following detailed description is made in coordination with the drawing of this application and discloses the structural and functional features of the invention. Throughout the drawing and description, conventional logic symbology and nomenclature is used and the optics are shown in a simplified schematic fashion. It is intended that these conventions be exemplary of the invention and not delimiting of its scope.

The organization of the wheel bearing detector disclosed in this application follows the normal system configuration found in prior art systems generally used today, except for those added features and modifications significant to the practice of the invention herein disclosed.

The thermal detector 6 is preferably a lead sulphide (PbS) photon detector, although a lead selenide (PbSe) or indium antimonide (InSb) or other types may be suitable in given situations. A bolometer although a satisfactory sensing device is not normally used in the practice of this invention, due to its rather long time constant and high cost. The thermal sensor 6 is the primary functioning unit of a thermal wheel scanner system and provides the initial signal in response to thermal radiation.

The optics 5 of the system gather the radiated energy and focus it upon the sensor 6. This energy may be transmitted from an actual passing bearing or from a target 3 controlled to simulate bearing temperatures. The optics 5 includes a primary parabolic gathering mirror 32 and a secondary flat mirror 31 for foucsing incident energy upon the thermal detector 6. This type of mirror arrangement, to those familiar with the art, is known as a modified Cassagrainian system and provides a required depth of field. The thermal detector 6 is placed behind the primary mirror 32 and receives reflected energy from the secondary mirror 31 through an aperture located at the center of primary mirror 32.

At such times as the detector system interrogates the bearings of a passing vehicle or train of vehicles, an outside shutter 1 is withdrawn from an aperture located in the housing of the detector optics and thermal detector 6, permitting a view of passing wheel bearings. The target 3 located on the structure, is at the same time removed from the field of view. A solenoid 24 and its associated driver 25 initiates withdrawal of the shutter 1 upon receipt of train or vehicle presence signals from auxiliary track devices.

An optical shutter 4 energized through its associated optical gate driver 18 and optical gate motor 19 is opened upon the receipt of a pulse signal generated by equipment sensitive to passing wheels. The timing of the optical shutter 4 opening is such that the system optics 5 is permitted to look only at that portion of passing wheels indicative of bearing temperature and no othr surface or source of energy which may introduce system errors or perturbations.

A preamplifier 7 receives an output signal from the thermal detector 6 and increases its level to a value required for the driving of the remaining system electronics, normally the preamplifier 7 is located in the same housing as the thermal detector thereby diminishing the effect of noise upon the low level thermal detector 6 signal. The output of the preamplifier 7 is further increased by a variable gain amplifier 8. The variable gain feature being added as an integral part of the modifications required for the practice of this invention. The output of the variable gain amplifier is conducted to a pulse stretcher and inverter unit 9 wherein the pulse duration relative to the signal generated by viewing each passing wheel bearing is increased and its polarity inverted for proper utilization by the data transmitter 23 and a comparator unit 10. The data transmitter unit 23 is normally used to communicate with a central control office and is energized upon sensing of a train or vehicle presence.

The equipment organization to this point follows that generally provided in detector systems except for a few modifications essential to the practice of the invention of this application, the remaining organization and devices described are primarily directed to and intended for the practice of this invention. The target 3 simulates the temperature associated with a wheel hub having a temperature indicative of incipient bearing failure. The target temperature control unit 20 maintains the temperature of the target 3 at a level normally 60° F. above ambient, which temperature is the threshold level commensurate with potential bearing failure. It has been determined that a wheel hub temperature 60° F. above ambient is indicative of incipient bearing failure, this temperature may be easily changed if added experience so necessitates. The maintenance of the desired temperature level is accomplished by energizing the heater coil 2 of target 3 from a source sensitive to both ambient and target temperature. Preferably this control may be derived from a bridge circuit having thermistors in two of its legs, one thermistor sensing ambient temperature and the second responsive to target temperature. Proper selection of circuit parameters in such a bridge circuit permits generation of a signal capable of providing the necessary control for maintenance of target temperature at a predetermined level above ambient temperature.

The target 3 is a black body which upon heating by the coil 2 provides a predictable level of heat radiation. This combination of coil 2 and black body 3, although normally covered by the optical shutter, remains in the field of the optics as long as no train presence signal is generated.

As previously indicated, actual empirical data has proven that over a wide range of ambient temperatures, the temperature differential indicative of bearing failure varies to a substantial degree. In applications where this affect must be considered, the target temperature control unit 20 is modified to establish a target temperaure as a function of ambient temperature. Such modification employs function generating circuitry incorporated within the bridge configuration; to those familiar in the art of control, the generation of temperatures in accordance with normally anticipated functions is a relatively simple matter and can be accomplished by the proper selection of bridge components and parameters.

A two speed timer 14 when not inhibited by a train signal provides an output reoccurring at one of two possible rates, a normal and a fast calibration rate. Flip-flop 15, which may comprise a monostable multivibrator of well known design, generates another output pulse commensurate with the end or trailing edge of the flip-flop 15 output pulse. An OR gate 17, of design well known to those skilled in the art, has three inputs; the first, the output pulse of flip-flop 16, the second, the output pulse of flip-flop 15, and the third, wheel pulses generated by wheel detecting device. Thus, the OR gate 17 produces an output in conjunction with the receipt of any one or more of the specified signals. The output of OR gate 17 is conducted to the optical gate driver 18 and provides for the opening of the optical shutter 4. The input to the optical gate driver 18 is also conducted to the pulse stretcher and inverter unit 9, and provides a gate signal allowing transmission of the output signal derived from the variable gain amplifier 8. This gating feature prevents the transmission of spuriously introduced signals.

The comparator unit 10 previously mentioned constitutes in effect the error detection portion of the servo system and functions to generate a signal relative to the difference between the signal received from the pulse stretcher and inverter unit 9 and two separate reference voltages, in actual system implementation, the signal is compared to one reference signal a small percentage above two volts and to a second signal a similar percentage below two volts, as the signal ranges above or below these reference levels a down or up output signal respectively is generated. The up or down signals are conducted to the count-up-count-down binary counter 11 and depending upon the direction of the signal causes either an increased or decreased count. The binary counter 11 is a normally reversable binary counter of the type disclosed, e.g., on page 335, paragraph 11.6 of, Pulse and Digital Circuits, by Milman and Taub published by McGraw Hill, and may comprise any number of stages commensurate with the calibration adjustments required for the specific application. Output lines $o-n$, e.g., 33, 34, 35 and 36 are representative of the signal lines connecting the binary counter 11 to the variable gain amplifier 8. Depending upon the count generated in response to the comparator 10 signal, different energization patterns appear on these lines and execute a change in gain. It must be recognized that other circuitry, such as an operational amplifier and capacitor combination, may be used to hold the gain adjustment value, provided such circuitry possesses the necessary time constant duration.

The variable gain amplifier 8, preferably includes a difference amplifier, one output of which goes to an associated output amplifier, and one input receives the signal from the preamplifier 7. The second input receives its signal from the output of the associated amplifier, through an attenuator adjusted by binary counter inputs $o-n$, such that the total gain through the difference amplifier and ouput amplifier combination will change depending upon the existing count.

The foregoing circuit arrangement provides an overall amplifier gain as a function of the individual gains of the difference amplifier, its associated output amplifier and the attenuator value established by the binary counter 11. As previously indicated an output of approximately 2 volts is normally provided in response to acquisition of target energy. Therefore depending upon the output signal of the comparator with respect to each pulse generated in response to exposure to the target 2 the gain of the system either remains constant, or increases and decreases in discrete steps to compensate for variations in the magnitude of the output pulse. Both the comparator 10 and binary counter 11 are gated by the pulse generated by flip-flop 16 so as to be only responsive to signals during the period of time corresponding to exposure to the target 2.

The use of a gating signal as, for example, developed by flip-flop 16 suggests the possibility of another important modification to a defective bearing detection system. As the optics of the detector view the passing wheel, due to the confined field of view, there results a scanning of the wheel surface from the hub, across the plate and approaching the rim. Since under certain conditions as, for example, a locked brake shoe, the temperature of the hub may be raised by heat generated on the rim, it would prove valuable to determine in which direction heat is flowing, i.e., whether toward the hub from the rim or vice versa. If a multiple gating technique is used it is possible to generate a heat pulse of the first instance when the detector is viewing the hub and a second heat pulse at a later time when viewing the plate near the rim; upon comparing these pulses and depending upon the direction of the existing differential.

The comparator 10 out signals in addition to affecting the operation of binary counter 11 are also brought to the input terminals of an OR gate 12. Upon receipt of either up or down signals, OR gate 12 generates an output pulse which changes the state of flip-flop 13, a bistable multivibrator. The output of flip-flop 13 introduces a signal into the two-speed timer 14 calling for the fast calibration rate to be imposed upon the system and thereby provides for the initiation of a new calibration cycle. Upon generation of the next timer pulse the flip-flop 13 is reset and returns to its normal output. Thus it is obvious that upon determination that the output signal is out of calibration a fast calibration rate will be established until the magnitude of the output signal is brought within operable limits.

An important aspect regarding the effectiveness of an overheated wheel bearing detector system is the necessity to determine the system calibration before and during the interrogation of a passing train or vehicle. In providing this capability a count recognition unit 26 is connected to certain output leads associated with the various stages of the binary counter 11 as indicated by line 37. Depending upon the limit of gain adjustment of which the amplifier 8 is capable or that which it is desirable to impose upon a system, two AND circuits 41 and 42 are arranged to recognize particular count patterns, indicating a high and low gain adjustment respectively. Upon recognition of either count the output from the AND circuit satisfied is brought to an OR gate 40 which generates an output signal in turn initiating an alarm 21 and imposing a distinctive change upon the output signal of variable gain amplifier 8. The combination of the alarm 21 and the change in signal height or either indication separately gives sufficient warning that the system is out of calibration prior to interrogation of the train. The same AND/OR logic circuitry provides inhibit signals to the comparator 10, preventing the revesible counter 11 from registering new counts of the same direction. The signals inhibit either the up or down comparator 10 signal from being generated, depending upon whether the maximum or minimum count has been reached.

With cessation of actual wheel interrogation means are provided by the action of the signal decay delay unit 22, for performing a rapid calibration and display of the resultant output signal to the control office for comparison and performance check purposes. As the train presence signal ends the signal delay unit 22 which may comprise one or more monostable multivibrators generates a start signal which produces an output from flip-flop 15 thereby commencing a calibration cycle while at the same time maintaining energization of the data transmitter 23. The commencement of a new calibration cycle during the period when data transmitter 23 is energized permits the transmission of a calibration output pulse at the end of each series of transmissions concerned with actual wheel bearings. This affords the opportunity of checking the actual calibration of the system during an interrogation period. The end of the pulse produced by the signal delay unit 22 extinguishes the energization to data transmitter 23 and returns the system to its normal calibration mode.

The embodiment as described shows an organization wherein an overheated wheel bearing detector is automatically compensated for variation in its response, whether it be due to aging, loss of optical efficiency, changes in ambient temperature or other factors either intrinsic or extrinsic to the system; to achieve a greater understanding of this invention, the exemplary embodiment is now considered in operative sequence.

Assuming the system is properly energized from a source of supply voltage the two-speed timer 14 commences generating a normal rate signal output of approximately 1 pulse per minute. With the occurrence of each pulse flip-flop 15 generates a pulse, the leading edge of this pulse provides an input to OR gate 17 and through the optical gate driver and optical gate motor 19 starts driving the optical shutter 4 into an open position. At the end of this pulse, the trailing edge, flip-flop 16 is energized which in turn produces a second pulse. This second pulse also being applied to OR gate 17 continues the energization of the optical gate motor and holds it in its open position. Upon opening of the optical shutter 4, the thermal detector 6, viz, an infrared cell, is exposed to the coil 2-black body 3 energy through the folded reflective optics of the Cassagrainian mirror system, viz, mirrors 32 and 31. With the impingement of this energy on the cell 6 a signal is developed and amplified by the preamplifier 7.

The variable gain amplifier 8 increases the mangitude of the signal in accordance with its gain setting and conducts it to the pulse stretcher and inverter unit 9 where the polarity is inverted and the duration increased. Contemporaneously with the development of this pulse, the output of flip-flop 16 is brought to the binary counter 11 and comparator 10 energizing them for a time commensurate with the pulse duration. If the signal amplitude developed by the pulse stretcher unit 9 is either above or below the reference voltage levels, an up or down signal is sent to the binary counter 11 and initiates a discreet change in count with a resultant effect upon the gain of the variable gain amplifier 8.

The same up or down command satisfies OR gate 12 and initiates a resultant output from flip-flop 13 thereby placing the two-speed timer 14 in a fast rate mode. Upon the occurrence of the next timing pulse, the operation of flip-flops 15 and 16 and OR gate 17 supply command signals, which again, subject the detector cell 6 to the target 3. Again through the same gating techniques previously outlined the output pulse from the pulse stretcher unit 9 is compared to the reference levels and the process of adjusting the gain by discreet steps continues at the fast rate until a gain is attained whereby the magnitude of output heat pulse is brought to within an acceptable level. Assuming that this occurs prior to either a maximum or minimum count being generated in the binary counter 11, the servo portion of the system is returned to its normal rate operation and continued sampling at approximately once per minute resumes. The system stays in this mode until or unless a heat pulse is generated falling without the reference voltage limits.

If, contrary to that previously assumed, the counter reaches a maximum or minimum limit prior to the desired level of pulse being produced, then the count recognition unit 26 initiates a signal energizing the alarm 21 and establishes a signal level indicative of a calibration malfunction.

Returning now to the situation previously assumed, i.e., the heat pulses correctly calibrated, a train or vehicle approaches the wayside location of the detector system. Upon approach a train presence signal is generated by equipment known to those skilled in the art when the train is at a distance sufficient to give adequate time to the system to go into its interrogating mode. The train presence signal immediately inhibits the operation of the two-speed timer 14 and also energizes the data transmitter 23 for communication with the central control office. This inhibition of the timer 14 effectively supresses operation of the system servo by removing the timing pulses and also through the action of driver 25 and solenoid 24 opens the housing aperture and removes the target 2 from the field of view. As the vehicle passes the specific location of the detector, a wheel pulse signal is generated by equipment, again known to one skilled in the art, at a time sufficient to allow the detector optics to view the desired section of the passing wheel. The opening of the optical shutter 4 is accomplished in an entirely analogous manner to that of the calibration mode except that the wheel pulse signal initiates the output from OR gate 17 and driving the shutter 4 through the optical gate driver 18 and optical gate motor 19. Upon the passing of each wheel, the wheel pulse signal ceases and the optical shutter 4 again closes preventing entry of stray energy into the system.

With each view of a passing wheel the infrared detector cell 6, through the folded optics, produces a signal, amplified by preamplifier 7, gain compensated amplifier 8 and altered by pulse stretcher and inverter unit 9. The final resultant signal of heat pulse is conducted to the data transmitter 23 and communicated to the control office. In the normal mode the comparator 10 and binary counter 11 are not responsive to the heat pulse due to the absence of the gating pulse generated by flip-flop 16 during the calibration mode.

Upon the passing of the vehicle or train, the presence signal ceases, returning the housing shutter 1 to its normal position and allowing the two-speed timer 14 to commence operation. As previously discussed the signal decay delay unit 22 initiates an immediate calibration cycle and allows its transmission by the data transmitter 23 so as to indicate the actual calibration of the system during the interrogation mode of operation and prior to resumption of a normal calibration cycle.

Thus has been described an improved overheated vehicle bearing detector system in which sensor means develops a signal correlative to the thermal energy from a generator and wherein calibration means servos the resultant sensor output to achieve a desired value. It is intended that the embodiment disclosed be exemplary of the invention and that the modifications and changes apparent to one skilled in the art being considered to be within the scope of this invention.

What is claimed is:

1. An improved apparatus for indicating overheated vehicle wheel bearings having, sensor means responsive to thermal energy for developing a signal correlative to the bearing temperature, generator means adapted to produce thermal energy and shutter means shielding said sensor means operative when activated for rendering the sensor means sensitive to thermal energy from the overheated bearings and the generator; wherein the improvement comprises:

calibration means for rendering the sensor means responsive to the generator means, including:
comparator means adapted to produce a signal corresponding to the difference between the resultant sensor means signal and a reference signal,
means responsive to the difference signal for adjusting the sensor means to produce a resultant signal effecting a difference signal less than a predetermined value; and in which the generator means is controlled to produce radiated thermal energy relative as a function of temperature above ambient and servoing the sensor means to produce a resultant sensor means signal of desired value, and gating means including:
a timer controlling the shutter means, the timer having a plurality of rates selected in response to the comparator means signal, thereby providing a calibrated sensor means for producing signals indicative of wheel bearing condition independent of variations in ambient temperature.

2. The system of claim 1 wherein the means adjusting the sensor means comprises, a device responsive to the magnitude and direction of the difference signal developed by the comparator means signal for adjusting the sensor means.

3. The system of claim 2 wherein the device is a reversible counter.

4. The system of claim 3 wherein the sensor means includes an amplifier, the gain of which is adjustable to produce the desired value of sensor means signal.

5. The system of claim 3 having means recognizing either a minimum count of a maximum count and generating signals relative thereto, and means responsive to the generated signal for indicating the occurrence of either the maximum or minimum count; and wherein, responsive to the maximum or minimum count recognition signal, the comparator means is inhibited from producing any difference signals in the same direction as the recognized count, and the amplifier gain is responsively adjusted to produce a distinctive change in sensor output.

6. The system of claim 5 wherein the recognition means includes a first and a second AND circuit, the first AND circuit being satisfied by a counter pattern correlative to a minimum count and the second AND circuit being satisfied by a counter pattern correlative to a maximum count, and an OR circuit responsive to the first and second AND circuits generates the indicating signal, the comparator means being responsive to both the first and second AND circuits for inhibiting the production of any difference signal in the same direction as the recognized count.

7. The system of claim 1 wherein the sensor means includes an infrared photon detector and a modified Cassagrainian optic system for focusing thermal energy on the detector.

8. The system of claim 7 wherein the modified Cassagrainian lens system consists of a primary parabolic reflector and a secondary flat reflector.

9. The system of claim 1 in which the timer is controlled to normally operate at a first rate, and to operate at a faster rate whenever the comparator means produces a signal of greater than a predetermined magnitude.

10. The system of claim 9 including, means for detecting the approach of a vehicle, and means responsive to the passage of a wheel; and wherein the timer is inhibited by actuation of the vehicle detecting means, the optical shutter means is actuated by a signal produced by the wheel sensing means, and means is provided for removing the generator means from the detector's field of view whenever a vehicle is detected.

11. The system of claim 10 wherein each sensor means signal developed in response to a passing wheel is conducted to means for manifesting an indication correlative to wheel bearing temperature, and the means for manifesting the distinctive indication is only energized upon detection of a vehicle.

12. The system of claim 11 having means for generating a first and second signal of limited durations upon cessation of the vehicle detection signal, the first signal actuating the optical shutter means and the second signal maintaining the indicator means operable, whereby the sensor means in exposed to the generator means thermal energy before the indicator means is rendered inoperable, thereby manifesting an indication relative to the sensor means developed in response to the generator means thermal energy.

13. An improved method for indicating overheated vehicle wheel bearings including, the steps of sensing thermal energy radiated from the bearing and responsively to the sensed thermal energy correlating to bearing temperature; wherein the improvement comprises the steps of periodically rendering the sensor responsive to calibrated thermal energy, servoing the sensor to produce a resultant signal of desired value, further comprising the steps of: comparing the resultant signal to a reference signal, developing a difference signal relative to the resultant signal and reference signal, and adjusting the sensor to produce a resultant signal reducing the difference signal to less than a predetermined magnitude, and timing the rendering of the sensor responsive to the calibrated energy at one rate in accordance with a difference signal equal to or less than predetermined value and at a second rate faster than said first rate in accordance with a difference signal greater than the predetermined value.

References Cited
UNITED STATES PATENTS

| | | | |
|---|---|---|---|
| 3,101,409 | 8/1963 | Fite | 250—71.5 |
| 3,208,060 | 9/1965 | Giuffrida et al. | 340—214 |
| 3,296,438 | 1/1967 | Main. | |
| 3,313,933 | 4/1967 | Sibley. | |

WILLIAM F. LINDQUIST, Primary Examiner

M. J. FROME, Assistant Examiner

U.S. Cl. X.R.

246—169; 250—83; 340—214